Patented Apr. 21, 1936

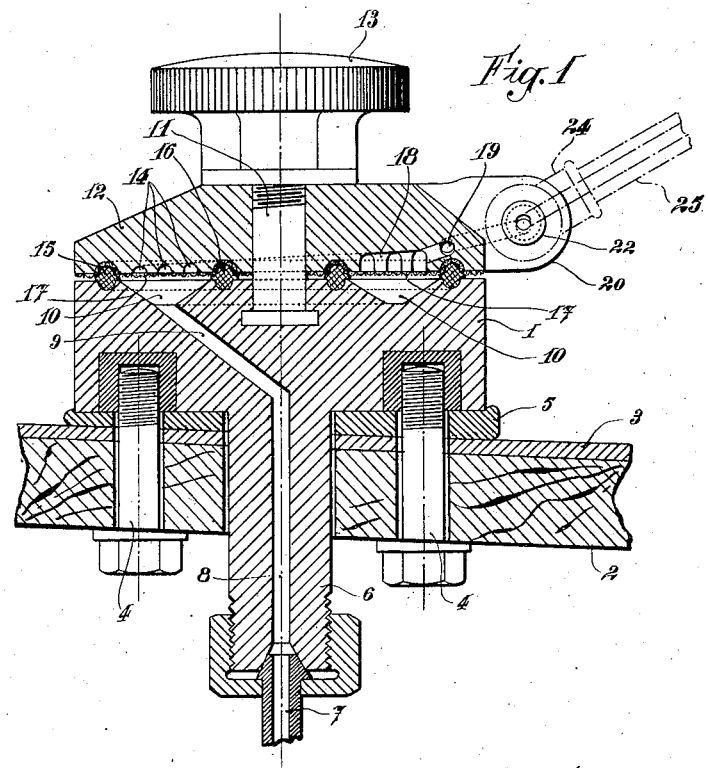
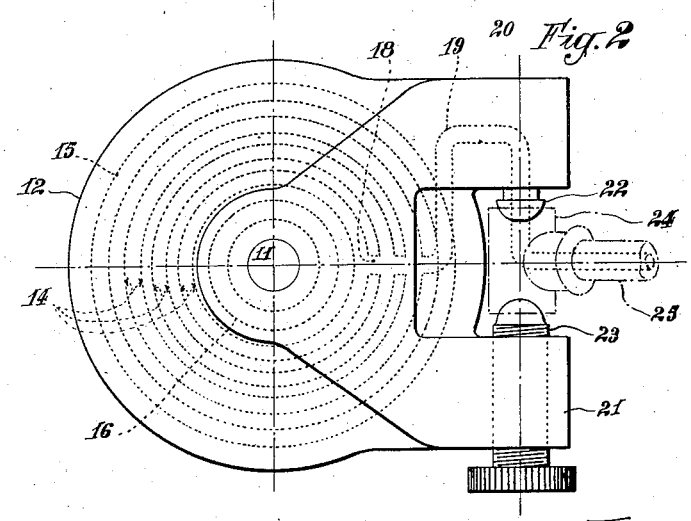

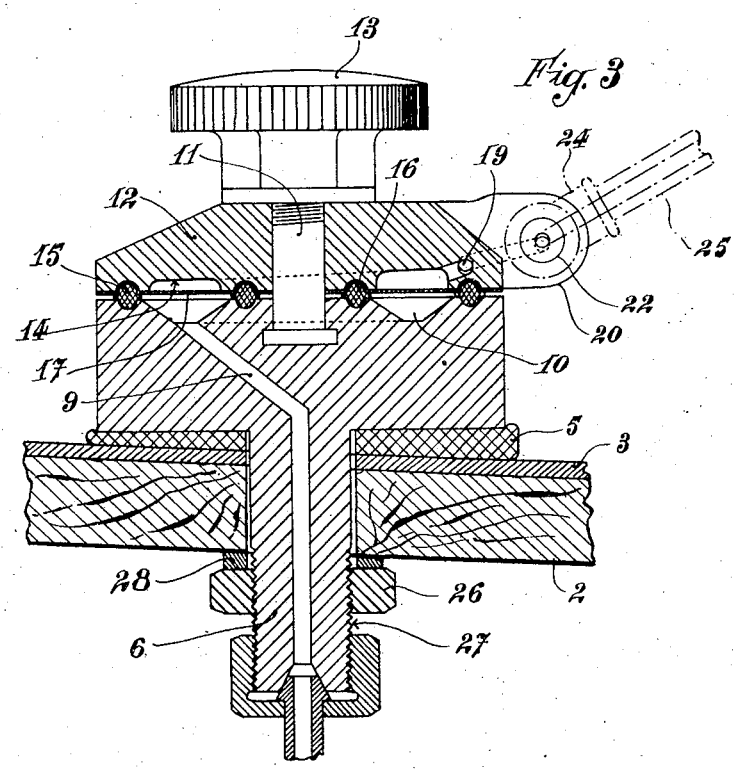

2,038,348

UNITED STATES PATENT OFFICE 2,038,348

INDIVIDUAL FILTER FOR THE SPINNING OF ARTIFICIAL FILAMENTS, THREADS, AND THE LIKE

Maurice Cusin, Lyon, France, assignor of one-half to Société Lyonnaise de Textiles, Lyon, France, a joint-stock company of France Application January 28, 1935, Serial No. 3,852
In France December 20, 1934

9 Claims. (Cl. 18—8)

In the spinning of artificial filaments, threads and the like, it is necessary to provide between each individual spinning pump and the corresponding nozzle a filter adapted to separate solid matter from the cellulosic solution. These filters are generally in the form of filtering candles arranged on the movable part of the rotatable joint of the nozzle supporting tube. A filter candle comprises a grooved body covered with filtering fabric through which the solution passes outwardly or inwardly. These filter candles require much care for a tight winding of the filtering fabric and for the maintenance of the joints in order to avoid leaks. Before the filter can work properly, any air entrapped within the candle and the nozzle supporting tube must be carefully expelled. This operation requires that the candle and the tube be disposed at a number of successive angular positions and a glass tube must be used as nozzle supporting tube in order that the air bubbles may be apparent to the operator. This entails a considerable loss of time and a material waste of spinnable solution.

The filtering terminal according to the present invention comprises a filter with plane filtering surface, fixed to the spinning bench and carrying the fixed member of the rotatable joint of the nozzle supporting tube, the spaces and conduits within said filter being arranged so that the air bubbles flow by themselves toward the aforesaid tube.

The filtering terminal preferably comprises a base fixed to the spinning bench, and a cover pressed on the said base by and axial means, the filtering fabric, in the form of a disk, being clamped by means of two concentric annular joints of material thickness which limit the filtering surface.

In the annexed drawings:

Fig. 1 is a general longitudinal section of a filtering terminal according to this invention.

Fig. 2 is the corresponding plan view, the upper screw being supposedly removed.

Fig. 3 is a general longitudinal section of a modification.

The filtering terminal comprises a circular base 1 fixed to the spinning bench 2—3 by means of screws such as 4 with interposition of a wedge 5 in such a way that the axis of base 1 is vertical although the bench is sloping. The bench is as usual formed of a board 2 coated with a sheet 3 of lead or other appropriate protecting metal. Base 1 has a tail 6 and to the end of the latter there is fixed a tube 7 which feeds the cellulosic solution from the individual spinning pump. Tail 6 is provided with an axial conduit 8 leading to an oblique conduit 9 which opens in a circular groove 10 on the upper face of base 1.

Base 1 also carries an axial stud 11 which passes through the base cover 12 and is threaded to receive a nut 13 adapted to press the said cover on base 1. The lower face of cover 12 is provided with three concentric grooves 14 which are disposed, as shown, above groove 10 of base 1. Corresponding semi-circular grooves of small cross-section are also provided on the upper face of base 1 and on the lower face of cover 12 for housing two thick annular gaskets 15 and 16, of circular cross-section, preferably made of rubber. The smaller one is interior to grooves 10 and 14, and the larger one exterior to the same. The filtering fabric is in the form of a disk with a hole in the centre; it is clamped between base 1 and cover 12, on or under gaskets 15 and 16 which limit the annular filtering surface.

At the highermost point of the grooves 14 of cover 12 there is a radial passageway 18 connecting said grooves 14 with each other and with an outlet conduit 19 which turns twice as shown in Fig. 2 and opens laterally of a projection 20 of cover 12. The latter also carries another projection 21, both projections 20 and 21 forming the bifurcated part of the rotatable joint of the nozzle supporting tube. Projection 20 carries the usual bored tip 22 which forms the outlet of conduit 19 and projection 21 carries the pressing screw 23 co-axial with tip 22. The rotatable base 24 of the nozzle supporting tube 25 is clamped between screw 23 and tip 22 and the nozzle supporting tube 25 is directly fixed to base 24 without the interposition of any filter candle.

The cellulosic solution flows from the spinning pump to groove 10 through conduit 7. It filters through fabric 17 and thence through grooves 14, passageway 18 and conduit 19 reaches the nozzle supporting tube 25.

Before the spinning is started, a clean filtering disk 17 is first placed on base 1, cover 12 is put on the disk and it is pressed downwards by means of nut 13. Gaskets 15 and 16 are thus forced into their respective grooves whereby they strongly stretch the fabric. The spinning pump is then started and the cellulosic solution flows into the apparatus rapidly dislodging the air without any risk that bubbles may remain entrapped between several layers of filtering fabric. If the tube 25 is set at an appropriate angle, it may be desaerated at the same time.

The upward pressure exerted on the filtering fabric is unable to distend the same because it is highly stretched, as above explained, and because it is maintained by the plain portions of cover 12 between grooves 14.

The device is easily made of non-metallic material (ebonite, hard-rubber, artificial resins, caseins, etc.) whereby any corrosion from the cellulosic solution or the coagulating bath is avoided. Screws 4 and stud 11, which are practically unapparent, may be made of steel without inconvenience, whereby the mechanical strength is high, while the known candle filters comprise threaded portions made of ebonite, porcelain or the like which are rapidly worn out or broken.

The desaerating operation being rapid and sure, the nozzle supporting tube may be made of an opaque material, such as ebonite or the like.

The number of grooves 14 may vary without departing from the invention; in some cases there may be provided but one wide groove 14 as shown in Fig. 3. Cover 12 may be fixed by any appropriate means: lateral screws, swinging stirrup, etc. The base may be fixed to the spinning bench by a nut 26 (Fig. 3) screwed on tail 6, the latter being correspondingly threaded as shown at 27. A wedge-shaped washer 28 is preferably inserted, as shown, between nut 26 and the lower face of the table 2.

What I claim is:—

1. A filtering terminal for the spinning of artificial filaments, threads and the like, comprising a base adapted to be fixed to a spinning bench and having an upper horizontal face recessed to form a chamber for receiving the solution to be spun; a channel in said base communicating with said chamber; a cover on said base having its lower face provided with one or more endless grooves registering with the recess in the base, the height of the grooves of the cover increasing to a common high point; means for pressing said cover on said base; a filtering sheet disposed between said base and cover; and a nozzle carried by the cover and having a tubular inlet connected with the high point of the grooves of the cover by a conduit inclining upwardly to the inlet.

2. In a filtering terminal as set forth in claim 1, said means for pressing the cover on the base comprising a stud disposed centrally with relation to the grooves and fixed to the base and passing upwardly through bores in the filtering sheet and cover; means on the stud for clamping the parts together; and gaskets interposed between the base and cover at opposite sides of the grooves.

3. In a filtering terminal as set forth in claim 1, said base having an axial depending tail portion adapted to be passed through the spinning bench, and provided with a bore for the solution to be spun communicating with the channel.

4. In a filtering terminal as set forth in claim 1, said base having an axial depending tail portion adapted to be passed through the spinning bench, and provided with a bore for the solution to be spun, communicating with the channel and said tail being threaded to receive a nut adapted to fix said terminal to the spinning bench.

5. A filtering terminal for the spinning of artificial filaments, threads and the like, comprising a base adapted to be fixed to a spinning bench and having an upper horizontal face recessed to form a chamber for receiving the solution to be spun; a channel in the base communicating with the chamber; a cover on said base having its lower face provided with one or more endless grooves registering with the recess in the base, the height of the grooves of the cover increasing to a common high point; means for pressing said cover on said base; a filtering sheet disposed between said base and cover; and a nozzle carried by the cover and having a tubular inlet connected with the high point of the grooves of the cover by a conduit inclining upwardly to the inlet, said base and cover having opposed endless grooves in their meeting faces embracing the grooves of the cover; and endless gaskets of material thickness in said opposed endless grooves; the said gaskets clamping the filtering sheet against one of the meeting faces.

6. In a filtering terminal as set forth in claim 5, said means for pressing the cover on the base comprising a stud disposed centrally with relation to the grooves and fixed to the base and passing upwardly through bores in the filtering sheet and cover; means on the stud for clamping the parts together; and gaskets interposed between the base and cover at opposite sides of the grooves.

7. In a filtering terminal as set forth in claim 5, said base having an axial depending tail portion adapted to be passed through the spinning bench, and provided with a bore for the solution to be spun communicating with the channel.

8. In a filtering terminal as set forth in claim 5, said base having an axial depending tail adapted to be passed through the spinning bench, and threaded to receive a nut adapted to fix said terminal to the spinning bench.

9. In a filtering terminal as set forth in claim 5, said base having an axial depending tail portion adapted to be passed through the spinning bench, and provided with a bore for the solution to be spun, communicating with the channel; and said tail being threaded to receive a nut adapted to fix said terminal to the spinning bench.

MAURICE CUSIN.